(12) United States Patent
Heo et al.

(10) Patent No.: US 10,372,468 B2
(45) Date of Patent: **\*Aug. 6, 2019**

(54) APPARATUS AND METHOD FOR CONFIGURING IDLE SCREEN

(71) Applicant: Samsung Electronics Co., Ltd., Gyeonggi-do (KR)

(72) Inventors: Dong-Kyu Heo, Seoul (KR); Dae-Kyu Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 115 days.

This patent is subject to a terminal disclaimer.

(21) Appl. No.: 15/425,503

(22) Filed: Feb. 6, 2017

(65) Prior Publication Data

US 2017/0147365 A1 May 25, 2017

Related U.S. Application Data

(63) Continuation of application No. 12/328,017, filed on Dec. 4, 2008, now Pat. No. 9,565,291.

(30) Foreign Application Priority Data

Dec. 4, 2007 (KR) .................... 10-2007-0125048

(51) Int. Cl.
*G06F 3/0481* (2013.01)
*G06F 9/451* (2018.01)
*H04M 1/725* (2006.01)

(52) U.S. Cl.
CPC ........ *G06F 9/451* (2018.02); *H04M 1/72569* (2013.01); *H04M 1/72583* (2013.01);
(Continued)

(58) Field of Classification Search
CPC ................................................. G06F 3/0481
See application file for complete search history.

(56) References Cited

U.S. PATENT DOCUMENTS 5,600,776 A 2/1997 Johnson et al.
6,771,290 B1 8/2004 Hoyle
(Continued)

FOREIGN PATENT DOCUMENTS

JP 2006-287556 10/2006

*Primary Examiner* — Matthew Ell
(74) *Attorney, Agent, or Firm* — The Farrell Law Firm, P.C.

(57) ABSTRACT

An apparatus and a method for configuring an idle screen in a terminal is provided. The apparatus includes a state sensor for sensing an environmental state a memory for storing a plurality of environmental state information items, each including at least one environmental state information, and a plurality of terminal function items, each associated with a corresponding environmental state information item and comprising at least one terminal function and a controller for when a change in a current environmental state is sensed while performing a selected terminal function, determining an environmental state information item corresponding to a changed environmental state, and updating the selected terminal function in a terminal function item corresponding to the determined environmental state information item, and when there is a request for displaying an idle screen, determining an environmental state item corresponding to the current environmental state from the memory, extracting one or more terminal functions of the terminal function item corresponding to the environmental state information item, and configuring the idle screen using the extracted one or more terminal functions.

20 Claims, 5 Drawing Sheets

(52) U.S. Cl.
CPC ..... *G06F 3/04817* (2013.01); *H04M 1/72572* (2013.01); *H04M 2250/12* (2013.01)

(56) References Cited

U.S. PATENT DOCUMENTS

| | | |
|---|---|---|
| 6,907,582 B2 | 6/2005 | Stanley |
| 7,073,129 B1 | 7/2006 | Roberts et al. |
| 7,254,631 B2 | 8/2007 | Crudele et al. |
| 2001/0003835 A1 | 6/2001 | Watts |

FIG.1

| | ENVIRONMENTAL STATE INFO | | | | | USER STATE INFO | | TERMINAL FUNCTIONS (NUMBER OF USES) |
|---|---|---|---|---|---|---|---|---|
| | DAY | TIME | POSITION | WEATHER | TEMPERATURE | USER MOOD | | |
| 1 | MON | 8:00~9:00 | SUBWAY | SUNNY | 20℃ | GOOD | | VIDEO(5) MUSIC(4) MESSAGE(4) ..... CALL(1) |
| 2 | TUE | 8:00~9:00 | SUBWAY | CLOUDY | 12℃ | NORMAL | | MUSIC(6) GAME(4) VIDEO(3) ..... MESSAGE(1) |
| 3 | WEN | 8:00~9:00 | SUBWAY | RAINY | 5℃ | TIRED | | SCHEDULE(5) MUSIC(5) CALL(4) ..... INTERNET(1) |
| ... | ... | ... | ... | ... | ... | ... | | ..... |
| n | SUN | 8:00~9:00 | HOME | RAINY | 5℃ | SAD | | CALL(8) MUSIC(7) MESSAGE(6) ..... CAMERA(2) |
| n+1 | MON | 8:00~10:00 | OFFICE | SUNNY | 20℃ | NORMAL | | MUSIC(8) CALL(8) SCHEDULE(7) ..... MESSAGE(3) |
| n+2 | TUE | 8:00~10:00 | OFFICE | CLOUDY | 14℃ | NORMAL | | MESSAGE(7) SCHEDULE(6) MEMO(5) ..... CALL(1) |
| n+3 | WEN | 8:00~10:00 | OFFICE | RAINY | 4℃ | GLOOMY | | CAMERA(8) VIDEO(7) MUSIC(7) ..... MEMO(2) |
| ... | ... | ... | ... | ... | ... | ... | | ..... |

APPARATUS AND METHOD FOR CONFIGURING IDLE SCREEN

PRIORITY

This application is a continuation of U.S. patent application Ser. No. 12/328,017 filed on Dec. 4, 2008, and claims priority under 35 U.S.C. § 119(a) to a Korean Patent Application filed in the Korean Intellectual Property Office on Dec. 4, 2007, and assigned Serial No. 10-2007-0125048, the entire disclosure of each of which is incorporated herein by reference.

BACKGROUND OF THE DISCLOSURE

1. Field of the Disclosure

The present disclosure relates generally to an apparatus and method for configuring an idle screen, and more particularly, to an apparatus and method for analyzing functions of a terminal according to a user's environmental state, and configuring an idle screen in accordance with the analysis.

2. Description of the Related Art

Generally, in a terminal such as a mobile communication terminal, in order to utilize a function of the terminal, a user searches for an established path that allows the user to utilize the corresponding terminal function. Recently, however, as the functions supported by the terminal are diversified and increased in number, the user is forced to search the menu screen every time to utilize the various terminal functions. More recent terminals support a function allowing the user to configure an idle screen with shortcut icons of the terminal functions that the user intends to utilize. This allows the user to directly utilize the desired terminal function by selecting a shortcut icon associated with the corresponding terminal function among the shortcut icons on the idle screen without the need for searching a separate menu screen provided for the terminal functions.

In the configuration described above, when the user wants to utilize a function other than the terminal functions that he/she previously set on the idle screen, the user must reconfigure the idle screen to incorporate a shortcut icon for the corresponding terminal's function.

In addition, since the terminal functions that the user intends to utilize may undergo a change according to environmental state information of the user, such as time, position, weather and temperature, and/or state information of the user, such as the user's mood, the conventional terminal has difficulty in providing a desirable idle screen for the user.

SUMMARY OF THE DISCLOSURE

The present disclosure has been made to address at least the above problems and/or disadvantages and to provide at least the advantages described below. Accordingly, an aspect of the present disclosure provides an apparatus and method for analyzing terminal functions that a user desires to utilize, according to environmental state information of the user, and for configuring an idle screen suitable to a terminal use pattern of the user.

According to an aspect of the present disclosure, an apparatus is provided for configuring an idle screen in a terminal. The apparatus includes a state sensor for sensing an environmental state a memory for storing a plurality of environmental state information items, each including at least one environmental state information, and a plurality of terminal function items, each associated with a corresponding environmental state information item and comprising at least one terminal function and a controller for when a change in a current environmental state is sensed while performing a selected terminal function, determining an environmental state information item corresponding to a changed environmental state, and updating the selected terminal function in a terminal function item corresponding to the determined environmental state information item, and when there is a request for displaying an idle screen, determining an environmental state item corresponding to the current environmental state from the memory, extracting one or more terminal functions of the terminal function item corresponding to the environmental state information item, and configuring the idle screen using the extracted one or more terminal functions.

According to another aspect of the present disclosure, a method for configuring an idle screen in a terminal is provided. The method includes storing a plurality of environmental state information items, each including at least one environmental state information, and a plurality of terminal function items, each associated with a corresponding environmental state information item and each including at least one terminal function, performing a selected terminal function, when a change in a current environmental state is sensed while performing the selected terminal function, determining an environmental state information item corresponding to a changed environmental state, and updating the selected terminal function in a terminal function item corresponding to the determined environmental state information item, and when there is a request for displaying an idle screen, determining a current environmental state item corresponding to the current environmental state, extracting one or more terminal functions corresponding to the determined environmental state information item, and configuring the idle screen using the extracted terminal functions.

BRIEF DESCRIPTION OF THE DRAWINGS

The above and other aspects, features and advantages of the present disclosure will become more apparent from the following detailed description when taken in conjunction with the accompanying drawings in which.

DETAILED DESCRIPTION OF PREFERRED EMBODIMENTS

Preferred embodiments of the present disclosure are described in detail with reference to the accompanying drawings. Similar components are designated by similar reference numerals although they are illustrated in different drawings. Detailed descriptions of constructions or processes known in the art may be omitted to avoid obscuring the subject matter of the present disclosure.

Figure 1:
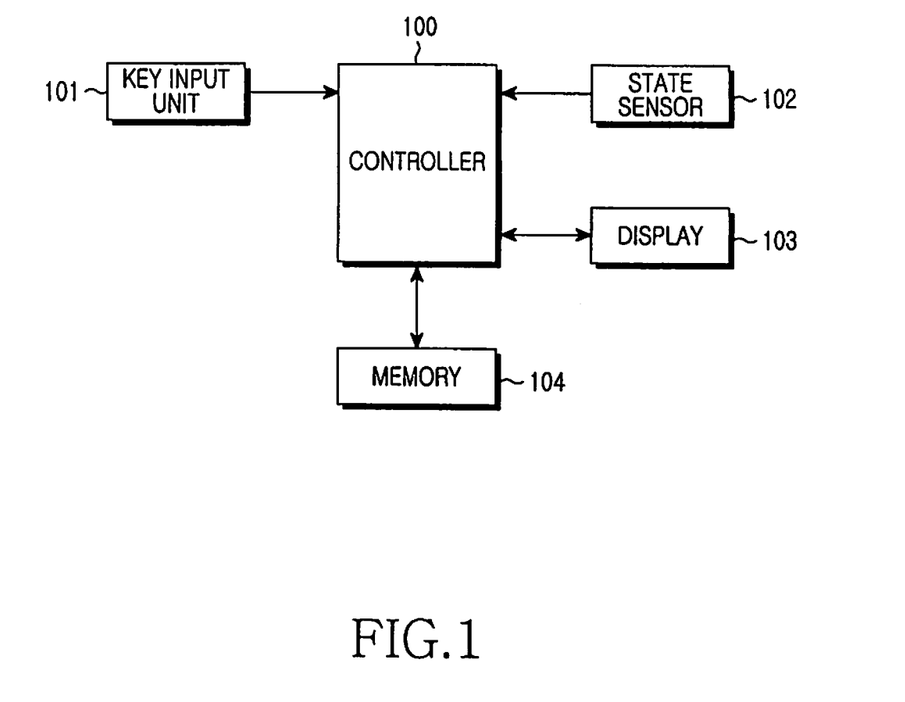
FIG. 1 is a block diagram of an idle screen configuring apparatus according to an embodiment of the present disclosure.

FIG. 1 provides a detailed description of a structure and an operation of an apparatus for configuring an idle screen according to a user's environmental state at a terminal. The terminal can be a Personal Computer (PC) or a mobile communication terminal such as a mobile phone or a Personal Digital Assistant (PDA), and the terminal is assumed herein to be a mobile communication terminal.

A controller 100 controls the overall operation of the mobile communication terminal. According to an embodiment of the present disclosure, the controller 100 checks if there is a key input for selecting a predetermined terminal function through a key input unit 101. If there is a key input for selecting a predetermined terminal function, the controller 100 senses the current environmental state by means of a state sensor 102. The 'environmental state' means the user's surrounding environmental state that undergoes a change according to a periodic or predetermined rule, such as day, time, position, weather and temperature. According to an embodiment of the present disclosure, the controller 100 can further sense, by means of the state sensor 102, a user state such as mood, temperature and body condition of the user in addition to the current environmental state.

Thereafter, the controller 100 checks an environmental state information item corresponding to the currently sensed environmental state among multiple environmental state information items stored in a memory 104. The controller 100 updates the selected terminal function in a terminal function item corresponding to the checked environmental state item. For example, assume that the current environmental state is 'Day: Tuesday', 'Time: 8:00~9:00', 'Position: Subway', 'Weather: Cloudy', and 'Temperature: 12° C.'. If there is a key input for selecting a music function through the key input unit 101, the controller 100 checks an environmental state information item corresponding to the current environmental state shown in an item #2 of FIG. 2 among the environmental state information items stored in the memory 104. The controller 100 updates the music function in the terminal function item corresponding to the checked environmental state information item. For example, if there is a music function among the terminal functions stored in the terminal function item, the controller 100 increases the number of uses of the corresponding music function, and stores (updates) it. If the number of uses of the music function stored in the memory 104 is 4, the updated number of uses of the music function is 5. If there is no terminal function coincident with the music function among the terminal functions stored in the terminal function item, the controller 100 adds the music function to the corresponding terminal function item, and stores it.

The controller 100 performs the selected terminal function operation while updating the selected terminal function in the terminal function item. The controller 100 checks if there is a change in environmental state information sensed through the state sensor 102 in the course of performing the selected terminal function operation. If there is a change, the controller 100 checks an environmental state information list corresponding to the changed environmental state through the memory 104. The controller 100 updates the selected terminal function in the terminal function item corresponding to the checked environmental state information list. The controller 100 then checks if there is a key input for ending the ongoing terminal function operation through the key input unit 101, and if there is the key input, the controller 100 checks the current environmental state sensed through the state sensor 102. The controller 100 checks an environmental state information item corresponding to the currently sensed environmental state among the environmental state information items stored in the memory 104. For example, assume that the user's currently sensed environmental state is 'Day: Monday', 'Time: 8:00~9:00', 'Position: Subway', 'Weather: Sunny' and 'Temperature: 20° C.'. If the current environmental state has changed to the environmental state that 'Day: Monday', 'Time: 9:00~10:00', 'Position: Office', 'Weather: Sunny' and 'Temperature: 22° C.', the controller 100 checks items corresponding to the current environmental state among the environmental state information items stored in the memory 104. If there is an item corresponding to the current environmental state shown in an item #(n+1) of FIG. 2 among the checked environmental state information items, the controller 100 extracts terminal functions corresponding to the environmental state information item #(n+1), such as music, call, schedule, message, etc. The controller 100 generates shortcut icons of the extracted terminal functions, configures an idle screen with the generated shortcut icons, and then displays it on a display 103. If there is no environmental state information item corresponding to the current environmental state among the environmental state information items stored in memory 104, the controller 100 continues to display the current idle screen on the display 103.

In the course of performing the selected terminal function operation, if there is a key input for ending the ongoing terminal function operation through the key input unit 101, the controller 100 checks the environmental state information item corresponding to the current environmental state. The controller 100 extracts the terminal functions corresponding to the checked environmental state information item by means of the memory 104. The controller 100 then generates shortcut icons of the extracted terminal functions, configures an idle screen with the generated shortcut icons, and then displays it on the display 103. For example, assume that a video function, a music function, a message function and a camera function (not shown) are included in a terminal function item corresponding to the current environmental state information item #1 of FIG. 2 on the idle screen configured with 3 shortcut icons. In this case, the idle screen configured with the shortcut icons of the terminal functions can be shown as FIG. 3A. If there is a key input for selecting the camera function from the user, the controller 100 performs a camera function operation while updating the number of uses of the camera function in the terminal function item corresponding to the current environmental state information item #1 of FIG. 2. Thereafter, if there is a request to end the camera function operation, the controller 100 checks the environmental state information item corresponding to the current environmental state, and extracts 3 terminal functions among the terminal functions corresponding to the checked environmental state information item in descending order of the number of uses. If the 3 extracted terminal functions include the video function, the music function and the camera function, the controller 100 generates shortcut icons of the extracted terminal functions, configures an idle screen with the generated shortcut icons, and then displays it on the display 103. The displayed idle screen can be shown as FIG. 3B. If there are terminal functions having an identical number of uses among the terminal functions, the controller 100 continues to display the existing idle screen, or the controller 100 reconfigures the idle screen by adding a shortcut icon of the newly updated terminal function, and then displays it on the display 103.

If there is no key input for selecting a terminal function through the key input unit 101 and there is a change in the current environmental state, the controller 100 checks an environmental state information item corresponding to the changed environmental state from the memory 104. The controller 100 extracts terminal functions corresponding to the checked environmental state information item by means of the memory 104. The controller 100 then generates shortcut icons of the extracted terminal functions, configures an idle screen with the generated shortcut icons, and then displays it on the display 103. However, if there is no change in the current environmental state, the controller 100 continues to display the existing idle screen.

The key input unit 101 has a key for selecting a predetermined terminal function, and a key for displaying an idle screen, and delivers key data corresponding to the key pressed by the user to the controller 100.

Figure 2:
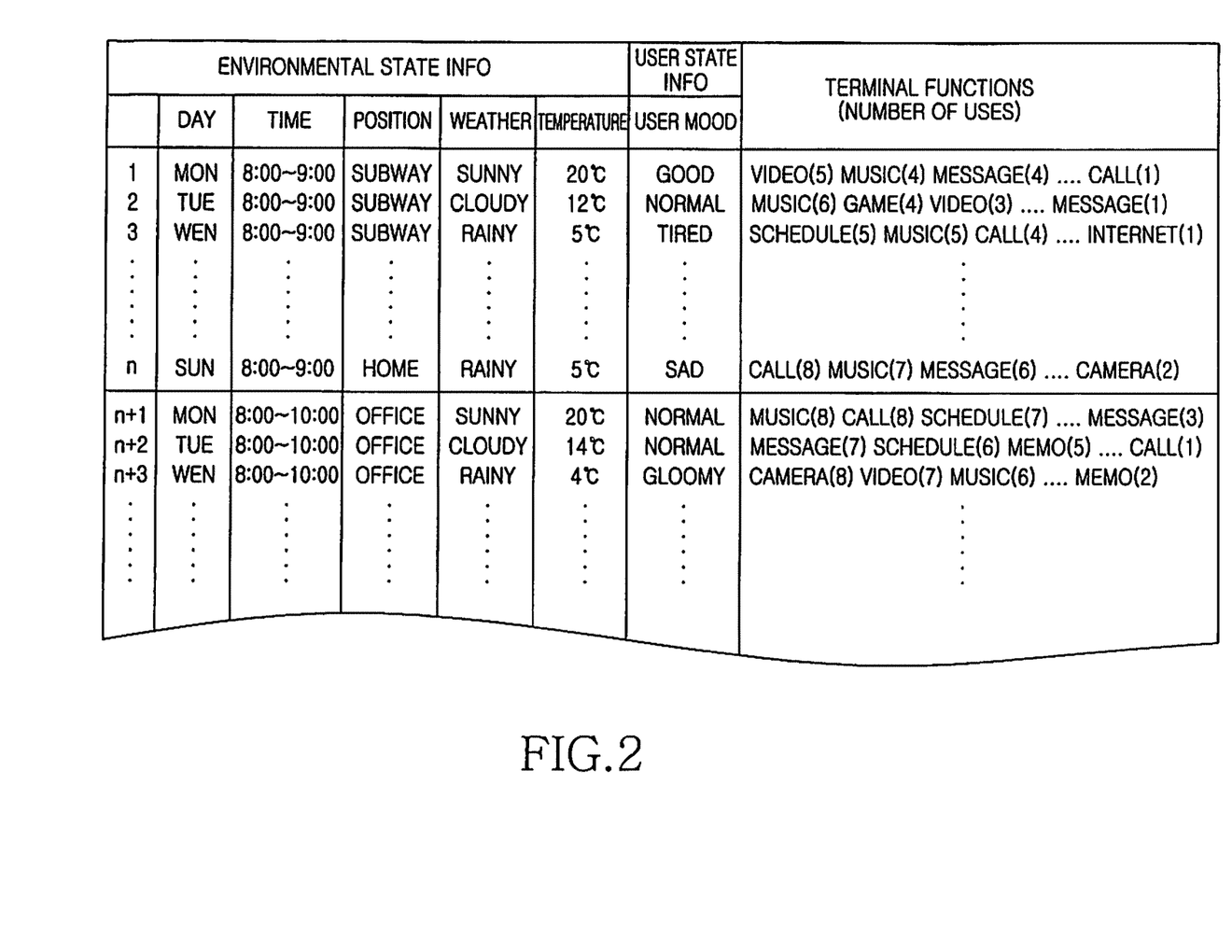
FIG. 2 is a diagram illustrating terminal functions corresponding to predetermined environmental state information according to an embodiment of the present disclosure.
Figure 3A:
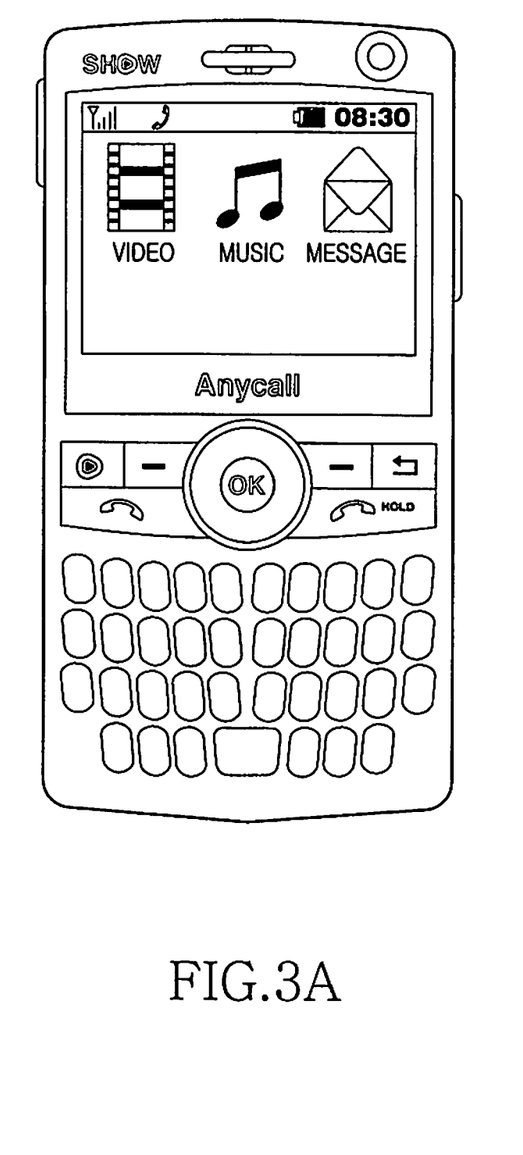
FIGS. 3A and 3B are diagrams illustrating idle screens configured according to an embodiment of the present disclosure.
Figure 3B:
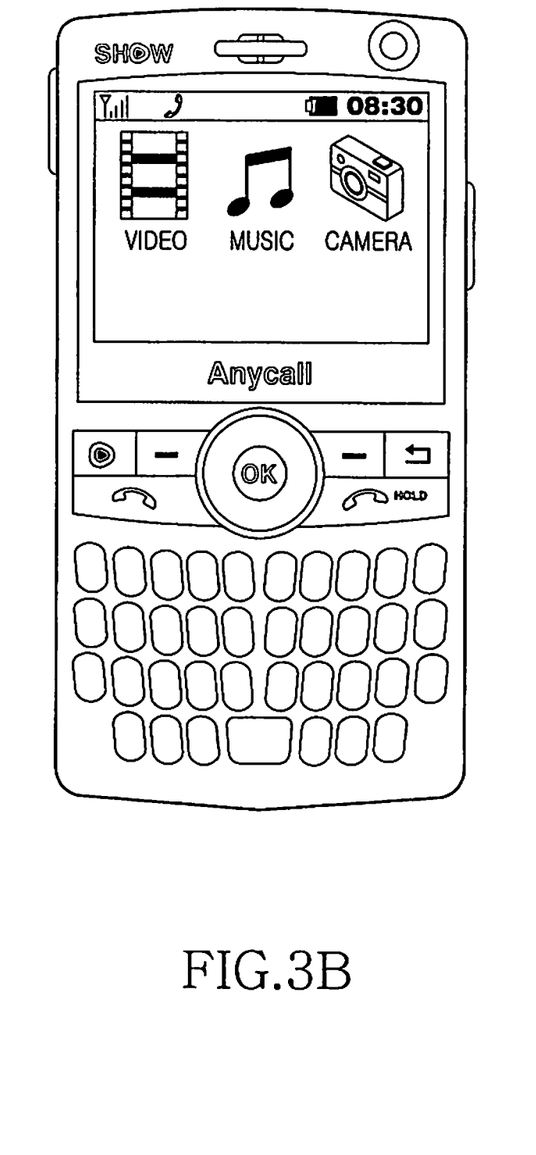

The state sensor 102 senses day and time information transmitted from the day and time information system, and weather information transmitted from the weather information system. The state sensor 102 includes a position sensing device such as Global Positioning System (GPS) for sensing positional coordinates of the user, and a sensor such as a temperature sensor for sensing the temperature. The state sensor 102, as described above in connection with the controller 100, can further include a sensor for sensing user state information such as mood, temperature and body condition of the user. Alternatively, the user can set the user state information. In an embodiment of the present disclosure, positional coordinates of the terminal sensed through the position sensing device can be set using a position name desired by the user, such as subway, office and home, as shown in FIG. 2.

The display 103 displays an idle screen configured with shortcut icons of the terminal functions.

The memory 104 stores at least one terminal function in a terminal function item corresponding to multiple environmental state information items composed of at least one environmental state information.

Figure 4:
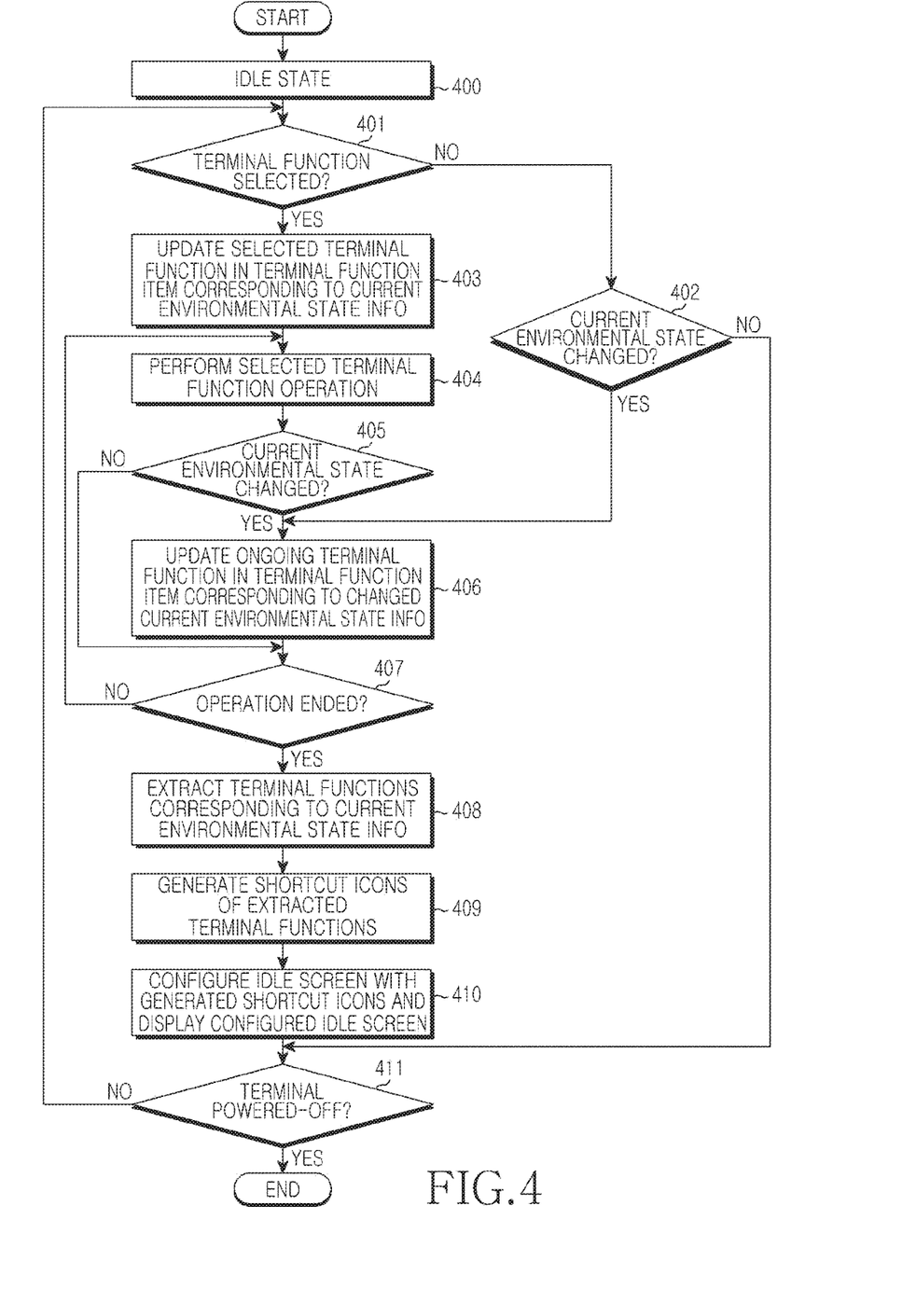
FIG. 4 is a control flowchart illustrating a procedure for analyzing terminal functions that a user intends to utilize, depending on the user's environmental state information, and configuring an idle screen depending on the analysis, according to an embodiment of the present disclosure.

With reference to FIG. 4, a detailed description will now be made of a procedure for analyzing terminal functions that a user intends to utilize, according to the environmental state at the terminal of FIG. 1, and for configuring an idle screen in accordance with a terminal use pattern of the user, according to an embodiment of the present disclosure. In the following description, the environmental state information item corresponding to the current environmental state is the current environmental state information item.

In step 400, the controller 100 keeps an idle state. In step 401, the controller 100 determines whether a terminal function is selected through the key input unit 101. If a terminal function is selected, the controller 100 proceeds to step 403, and otherwise, the controller 100 proceeds to step 402.

In step 403, the controller 100 updates the selected terminal function in a terminal function item corresponding to the current environmental state information. In step 404, the controller 100 performs an operation for the selected terminal function. In step 405, the controller 100 determines whether there is a change in the current environmental state in the course of performing the operation for the selected terminal function. If there is a change, the controller 100 proceeds to step 406, and otherwise, the controller proceeds to step 407. In step 406, the controller 100 updates the ongoing terminal function in the terminal function item corresponding to the current environmental state information.

In step 407, the controller 100 determines whether an event for displaying the idle screen has occurred. If the event has occurred, the controller 100 proceeds to step 408, and otherwise, the controller returns to step 404 where it continuously performs the operation for the selected terminal function. In an embodiment of the present disclosure, the event for displaying the idle screen is a request for ending the operation for the selected terminal function.

The controller 100 extracts terminal functions corresponding to the current environmental state information in step 408, and generates shortcut icons of the extracted terminal functions in step 409. In step 410, the controller 100 configures an idle screen with the generated shortcut icons, and displays the idle screen.

In step 402, the controller 100 determines whether there is a change in the current environmental state. If there is a change, the controller 100 proceeds to step 407, and otherwise, the controller proceeds to step 411. In step 406, the controller 100 updates the ongoing terminal function in the terminal function item corresponding to the current environmental state information, and then performs steps 407~410. In an embodiment of the present disclosure, the event for displaying the idle screen is a change in the current environmental state information.

In step 411, the controller 100 determines whether a terminal power is turned off. If the terminal power is turned off, the controller 100 ends the idle screen configuring procedure, and otherwise, the controller 100 returns to step 401 where it checks if there is a request for selecting a terminal function. Thereafter, the controller 100 performs steps 402~411.

Although a description of the present disclosure has been made for a method of configuring an idle screen in the mobile communication terminal, however the proposed idle screen configuring method can be used in other terminals, such as a PC.

A terminal is provided that analyzes terminal functions that a user intends to utilize, according to the environmental state, and provides an idle screen suitable to a terminal use pattern of the user, making it possible to easily and rapidly provide the desired idle screen to the user without the user's need for configuring the idle screen.

While the disclosure has been shown and described with reference to a certain preferred embodiment thereof, it will be understood by those skilled in the art that various changes in form and details may be made therein without departing from the spirit and scope of the disclosure as defined by the appended claims.

What is claimed is:

1. An electronic device comprising:
   a sensor;
   a display;
   a memory; and
   a processor configured to at least:
   control the memory to store environmental state information corresponding to an environmental state obtained via the sensor,
   control the memory to store a use number of each function of the electronic device based on the environmental state information, in response to a request for displaying an idle screen on the display,
   identify at least one function from among functions of the electronic device based on the use number and current environmental state information, the idle screen including icons corresponding to the functions of the electronic device, and display, on the display, the idle screen by adding at least one icon for executing the at least one function.

2. The electronic device of claim 1, wherein the environmental state information includes at least one of weather information, temperature information, time information, day information, or position information.

3. The electronic device of claim 1, wherein the processor is further configured to:
 identify whether there is a function that is identical to the at least one function from among the functions included in a function item of the electronic device when storing the use number of the each function of the electronic device, and
 increase and store a number of uses of the identical function when there is a function that is identical to the selected at least one function.

4. The electronic device of claim 1, wherein the processor is further configured to:
 identify whether there is a function that is identical to the at least one function from among the functions included in a function item of the electronic device when storing the use number of the each function of the electronic device, and
 add and store the at least one function to the function item when there is no a function that is identical to the at least one function.

5. The electronic device of claim 1, wherein, when displaying the idle screen, the processor is further configured to:
 generate shortcut icons of the functions; and
 configure the idle screen using the shortcut icons.

6. The electronic device of claim 1, wherein, when the at least one function is identified, the processor is further configured to:
 identify an environmental state information item corresponding to the current environmental state information from the memory, and
 perform an operation for the at least one function while updating the use number of the at least one function in a function item of the electronic device corresponding to the identified environmental state information item.

7. The electronic device of claim 1, wherein
the processor is further configured to:
 obtain user state information via the sensor;
 control the memory to store each of a plurality of environmental state information items and at least one function item so that they are associated with one of a plurality of user state information items each including at least one piece of the user state information; and
 when there is a change in a current user state while performing the at least one function:
  identify, from the memory, a user state information item and an environmental state information item corresponding to the changed user state and the current environmental state information, and
  update the at least one function in a function item corresponding to the identified user state information item and the identified environmental state information item, and
 when there is a request for displaying the idle screen:
  identify, from the memory, a user state information item and an environmental state information item corresponding to a current user state and the current environmental state information,
  identify, from the memory, functions corresponding to the identified user state information item and the identified environmental state information item, and configure the idle screen using the identified functions.

8. The electronic device of claim 7, wherein the user state information includes at least one of a temperature or a body condition of the user.

9. The electronic device of claim 7, wherein, when the at least one function is identified, the processor is further configured to:
 identify, from the memory, an environmental state information item and a user state information item corresponding to the current environmental state information and the current user state, and
 perform an operation for the at least one function while updating the use number of the at least one function in the function item corresponding to the identified environmental state information item and the identified user state information item.

10. The electronic device of claim 7,
wherein, when there is a change in the current user state, the processor is further configured to:
 identify, from the memory, a user state information item and an environmental state information item corresponding to the current user state and the current environmental state information, and
 update the use number of the at least one function in the function item corresponding to the identified user state information item and the identified environmental state information item, and
wherein, when there is a request for displaying the idle screen, the processor is further configured to:
 identify, from the memory, a user state information item and an environmental state information item corresponding to the current user state and the current environmental state information,
 identify, from the memory, functions corresponding to the identified user state information item and the identified environmental state information item, and
 configure the idle screen using the identified functions.

11. A storage medium of an electronic device storing instructions, wherein the instructions, when executed by at least one processor, cause the at least one processor to perform at least one operation, wherein the at least one operation comprises:
 storing, in a memory of the electronic device, environmental state information corresponding to a environmental state obtained via a sensor of the electronic device;
 storing a use number of each function of the electronic device based on the environmental state information in the memory, in response to a request for displaying the idle screen on a display of the electronic device;
 identifying at least one function from among functions of the electronic device based on the use number and current environmental state information, the idle screen including icons corresponding to the functions of the electronic device; and
 displaying, on the display, the idle screen by adding at least one icon for executing the at least one function.

12. The storage medium of claim 11, wherein storing the use number comprises:
 identifying whether there is a function that is identical to the at least one function among the functions included in a function item of the electronic device; and
 when there is a function that is identical to the at least one function, increasing and storing a number of uses of the identical function.

13. The storage medium of claim 11, wherein storing the use number comprises:
 identifying whether there is a function that is identical to the at least one function among the functions included in a function item of the electronic device; and when there is no a function that is identical to the at least one function, adding and storing the at least one function to the function item.

14. The storage medium of claim 11, wherein the at least one operation further comprises:
    when the at least one function is identified, identifying an environmental state information item corresponding to the current environmental state information from the memory; and
    performing an operation for the at least one function while updating the use number of the at least one function in a function item of the electronic device corresponding to the identified environmental state information item.

15. The storage medium of claim 11, wherein storing the environmental state information comprises:
    obtaining user state information via the sensor; and
    storing a plurality of environmental state information items and a plurality of function items each comprising functions of the electronic device so that each of the plurality of function items and each of the plurality of environmental state information items are associated with one of a plurality of user state information items including at least one piece of the user state information.

16. The storage medium of claim 15, wherein the at least one operation further comprises:
    when there is a change in a current user state while performing the at least one function, identifying, from the memory, a user state information item and an environmental state information item corresponding to the changed user state and the current environmental state information.

17. The storage medium of claim 16, wherein storing the use number comprises:
    updating the use number of the at least one function in a function item corresponding to the identified user state information item and the identified environmental state information item.

18. The storage medium of claim 16, wherein the at least one operation further comprises:
    when there is a request for displaying the idle screen, identifying, from the memory, a user state information item and an environmental state information item corresponding to the current user state and the current environmental state information;
    identifying, from the memory, functions corresponding to the identified user state information item and the identified environmental state information item; and
    configuring the idle screen using the identified functions.

19. The storage medium of claim 16, wherein the at least one operation further comprises:
    when the at least one function is identified, identifying, from the memory, an environmental state information item and a user state information item corresponding to the current environmental state information and the current user state; and
    performing an operation for the at least one function while updating the use number of the at least one function in a function item corresponding to the identified environmental state information item and the identified user state information item.

20. The storage medium of claim 16, wherein the at least one operation further comprises:
    when there is a request for displaying the idle screen while performing the at least one function:
        identifying, from the memory, a user state information item and an environmental state information item corresponding to the current user state and the current environmental state information;
        identifying, from the memory, functions corresponding to the determined user state information item and the determined environmental state information item;
        generating shortcut icons of the identified functions; and
        configuring the idle screen using the shortcut icons.

* * * * *